(12) United States Patent
Dravneek et al.

(10) Patent No.: US 10,476,813 B2
(45) Date of Patent: Nov. 12, 2019

(54) COMPUTERIZED SYSTEM FOR IDENTIFYING AND REDISTRIBUTING COMPLEMENTARY RESOURCES

(71) Applicant: Bank of America Corporation, Charlotte, NC (US)

(72) Inventors: Victoria L. Dravneek, Charlotte, NC (US); Katherine Dintenfass, Lincoln, RI (US); Robert S. Kerr, Charlotte, NC (US); Jason Christian Karmelek, Mendon, MA (US)

(73) Assignee: Bank of America Corporation, Charlotte, NC (US)

( * ) Notice: Subject to any disclaimer, the term of this patent is extended or adjusted under 35 U.S.C. 154(b) by 302 days.

(21) Appl. No.: 15/433,797

(22) Filed: Feb. 15, 2017

(65) Prior Publication Data
US 2018/0234354 A1 Aug. 16, 2018

(51) Int. Cl.
| | |
|---|---|
| G06F 15/16 | (2006.01) |
| H04L 12/911 | (2013.01) |
| H04L 29/08 | (2006.01) |
| H04L 12/24 | (2006.01) |
| G06Q 30/02 | (2012.01) |
| G06Q 30/06 | (2012.01) |

(52) U.S. Cl.
CPC ....... *H04L 47/822* (2013.01); *G06Q 30/0251* (2013.01); *G06Q 30/0253* (2013.01); *G06Q 30/0601* (2013.01); *G06Q 30/0631* (2013.01); *G06Q 30/0633* (2013.01); *H04L 47/788* (2013.01); *H04L 47/823* (2013.01)

(58) Field of Classification Search
CPC .... H04L 47/788; H04L 47/822; H04L 47/823
USPC .......................................................... 709/226
See application file for complete search history.

(56) References Cited

U.S. PATENT DOCUMENTS

| | | | |
|---|---|---|---|
| 5,950,193 A | 9/1999 | Kulkarni |
| 6,819,919 B1 | 11/2004 | Tanaka |
| 8,249,995 B2 | 8/2012 | Sheperd |
| 8,433,713 B2 | 4/2013 | Chen et al. |
| 8,543,515 B2 | 9/2013 | McGovern et al. |

(Continued)

OTHER PUBLICATIONS

GoGig, Find Work, retrieved from the internet at https://www.gogig.com/work on Feb. 15, 2017; 7 pages.

*Primary Examiner* — Kevin T Bates
*Assistant Examiner* — Golam Mahmud
(74) *Attorney, Agent, or Firm* — Michael A. Springs; Moore & Van Allen PLLC; Peter B. Stewart

(57) ABSTRACT

A system may be configured for: analyzing resource transfers to identify a subset of users having complementary resource transfer patterns; monitoring resource transfers of the subset of users; determining that a user has a resource surplus; transferring resources corresponding to the resource surplus from the user to a resource pool; determining that the second user has a resource deficiency; and transferring resources corresponding to the resource deficiency from the resource pool to the second user. The system may also be configured for: monitoring actions of the user within a client application; based on monitoring the actions of the user, predicting a future user action of the user within the client application; and transmitting a command to the client application, wherein the command is configured to cause the client application to display an interface for performing the future user action.

18 Claims, 3 Drawing Sheets

(56) References Cited

U.S. PATENT DOCUMENTS

| | | |
|---|---|---|
| 8,612,359 B2 | 12/2013 | Hull et al. |
| 8,843,429 B2 | 9/2014 | Wang et al. |
| 8,892,480 B2 | 11/2014 | Eustice et al. |
| 8,909,950 B1 | 12/2014 | Levchuk et al. |
| 8,977,618 B2 | 3/2015 | Chen et al. |
| 8,990,143 B2 | 3/2015 | Hohndel et al. |
| 9,390,422 B2 | 7/2016 | Toomey |
| 9,535,751 B2 | 1/2017 | Stelmar Netto |
| 2002/0194112 A1 | 12/2002 | dePinto et al. |
| 2003/0060214 A1 | 3/2003 | Hendrey et al. |
| 2003/0084051 A1 | 5/2003 | Depura et al. |
| 2003/0182171 A1 | 9/2003 | Vianello |
| 2005/0055306 A1 | 3/2005 | Miller et al. |
| 2006/0106774 A1 | 5/2006 | Cohen et al. |
| 2006/0155636 A1 | 7/2006 | Hermann et al. |
| 2008/0082466 A1 | 4/2008 | Meijer et al. |
| 2011/0099119 A1 | 4/2011 | Kwiat et al. |
| 2011/0145556 A1 | 6/2011 | Hakoun et al. |
| 2011/0208664 A1 | 8/2011 | Rahman |
| 2012/0084342 A1 | 4/2012 | Brown et al. |
| 2012/0239585 A1 | 9/2012 | Bailey |
| 2012/0264098 A1 | 10/2012 | Megargel et al. |
| 2013/0060651 A1 | 3/2013 | Konduri |
| 2013/0159408 A1* | 6/2013 | Winn .................. G06N 20/00 709/204 |
| 2013/0166609 A1 | 6/2013 | Hao et al. |
| 2014/0208268 A1 | 7/2014 | Jimenez |
| 2014/0348139 A1* | 11/2014 | Gomez Martinez ........................ H04L 5/0053 370/336 |
| 2015/0006295 A1 | 1/2015 | Liu et al. |
| 2015/0227632 A1 | 8/2015 | Lunardi et al. |
| 2015/0339631 A1 | 11/2015 | Hodges |
| 2015/0373011 A1 | 12/2015 | Subramanya et al. |
| 2016/0077721 A1* | 3/2016 | Laubach ............. G06F 3/04895 715/765 |
| 2016/0080485 A1 | 3/2016 | Hamedi |
| 2016/0142443 A1 | 5/2016 | Ting et al. |
| 2016/0239806 A1 | 8/2016 | Benham et al. |
| 2016/0300191 A1 | 10/2016 | Leslie |
| 2016/0307160 A1 | 10/2016 | Khasnis et al. |
| 2016/0342644 A1 | 11/2016 | Stolarz et al. |
| 2017/0187644 A1* | 6/2017 | Eckstein ............... H04L 47/783 |
| 2017/0193410 A1 | 7/2017 | Jones-McFadden et al. |
| 2017/0346756 A1* | 11/2017 | Bullock .................. H04L 47/70 |
| 2017/0359230 A1* | 12/2017 | Dintenfass ............. H04L 41/22 |
| 2018/0088752 A1 | 3/2018 | Wakerly et al. |
| 2018/0123912 A1* | 5/2018 | Bryant ................ H04L 41/5038 |
| 2018/0139208 A1 | 5/2018 | Ho et al. |
| 2018/0213033 A1 | 7/2018 | Subbian |
| 2018/0234354 A1 | 8/2018 | Dravneek et al. |

* cited by examiner

COMPUTERIZED SYSTEM FOR IDENTIFYING AND REDISTRIBUTING COMPLEMENTARY RESOURCES

FIELD OF THE INVENTION

The present invention embraces a computerized system for identifying and redistributing complementary resources. The system is typically configured for: analyzing resource transfers to identify a subset of users having complementary resource transfer patterns; monitoring resource transfers of the subset of users; determining that a user has a resource surplus; transferring resources corresponding to the resource surplus from the user to a resource pool; determining that the second user has a resource deficiency; and transferring resources corresponding to the resource deficiency from the resource pool to the second user.

BACKGROUND

With the proliferation of Internet technology in recent times, people may utilize online systems to connect with other users or access resources. Conventional methods may include using online website postings to coordinate the users and resources. That said, there are a number of technical problems with using conventional online systems in this manner. In particular, current systems require the users to constantly sift through postings to determine what is relevant and not relevant, thereby leading to inefficiencies of computing resources such as processing power, memory, and network bandwidth.

Accordingly, there is a need for a more efficient and dynamic way to connect users and resources with one another.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In one aspect, the present invention embraces a computerized system, and an associated method and computer program product, for identifying and redistributing complementary resources. The system typically includes a processor, a memory, and a communication device in communication with a plurality of user devices of a plurality of users over a network. The plurality of user devices may include a first user device of a first user and a second user device of a second user. The system also typically includes a resource management module stored in the memory and executable by the processor. In one embodiment, the resource management module is configured for: analyzing resource transfers of the plurality of users to identify a subset of users having complementary resource transfer patterns; assigning each user of the subset of users to a complementary user pool; monitoring, in real-time, resource transfers of the subset of users assigned to the complementary user pool, the subset of users including the first user and the second user; determining that the first user has a resource surplus; in response to determining that the first user has the resource surplus, transferring resources corresponding to the resource surplus from the first user to a resource pool assigned to the complementary user pool; determining that the second user has a resource deficiency; and, in response to determining that the second user has the resource deficiency, transferring resources corresponding to the resource deficiency from the resource pool assigned to the complementary user pool to the second user.

In a first particular embodiment, the resource management module is configured for establishing a secure communication channel with a client application stored on the first user device of the first user; monitoring, in real-time, over the secure communication channel, actions of the first user within the client application; on monitoring the actions of the first user within the client application, predicting a future user action of the first user within the client application; and, in response to predicting the future user action, transmitting, over the secure communication channel, a command to the client application, wherein the command is configured to cause the client application to display an interface for performing the future user action.

In a first aspect of the first particular embodiment, monitoring the actions of the first user within the client application includes tracking the first user's mouse cursor position, touchscreen inputs, key strokes, or time accessing a particular interface of the client application.

In a second aspect of the first particular embodiment, the resource management module is configured for: collecting, over the secure communication channel, user data associated with the first user from the client application; and, based on collecting the user data associated with the first user, determining at least one user attribute. Collecting the user data may include collecting, over the secure communication channel, resource data associated with the first user from the client application; the resource management module is configured for, based on collecting the resource data associated with the first user, identifying a plurality of resources of the first user and classifying each resource of the plurality of resources; and determining the at least one user attribute may be based on classifying each resource of the plurality of resources. Predicting the future user action may be further based on the at least one user attribute.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
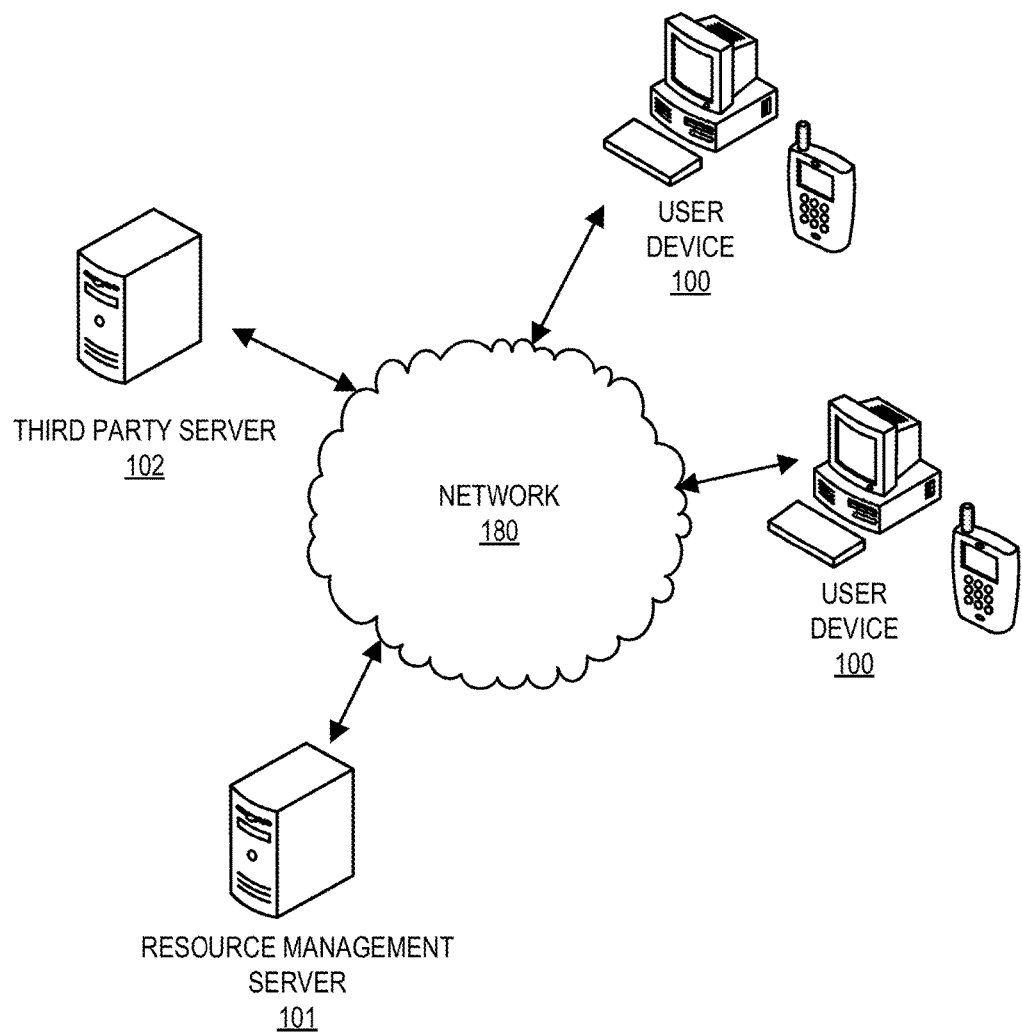
Figure 2:
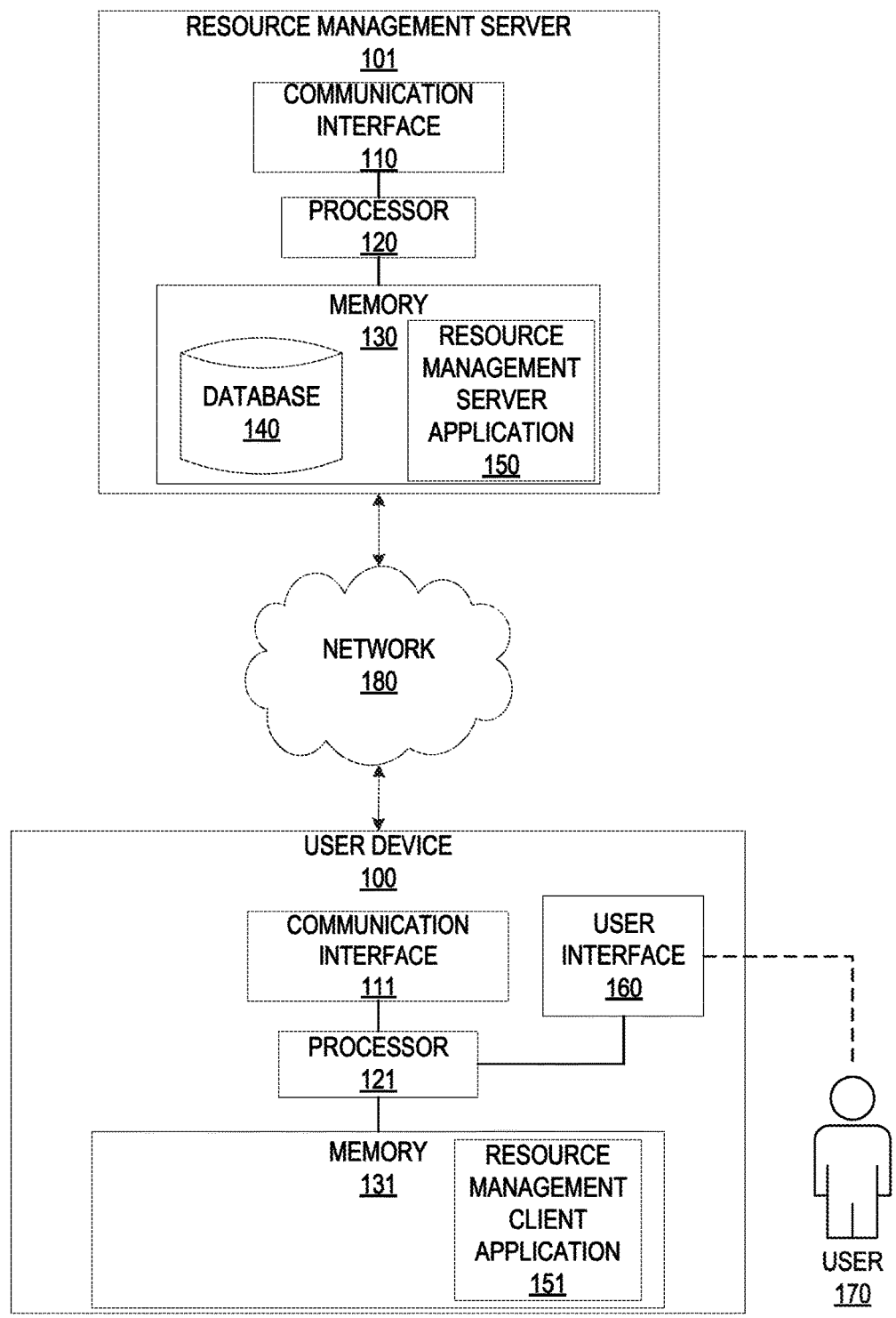
Figure 3:
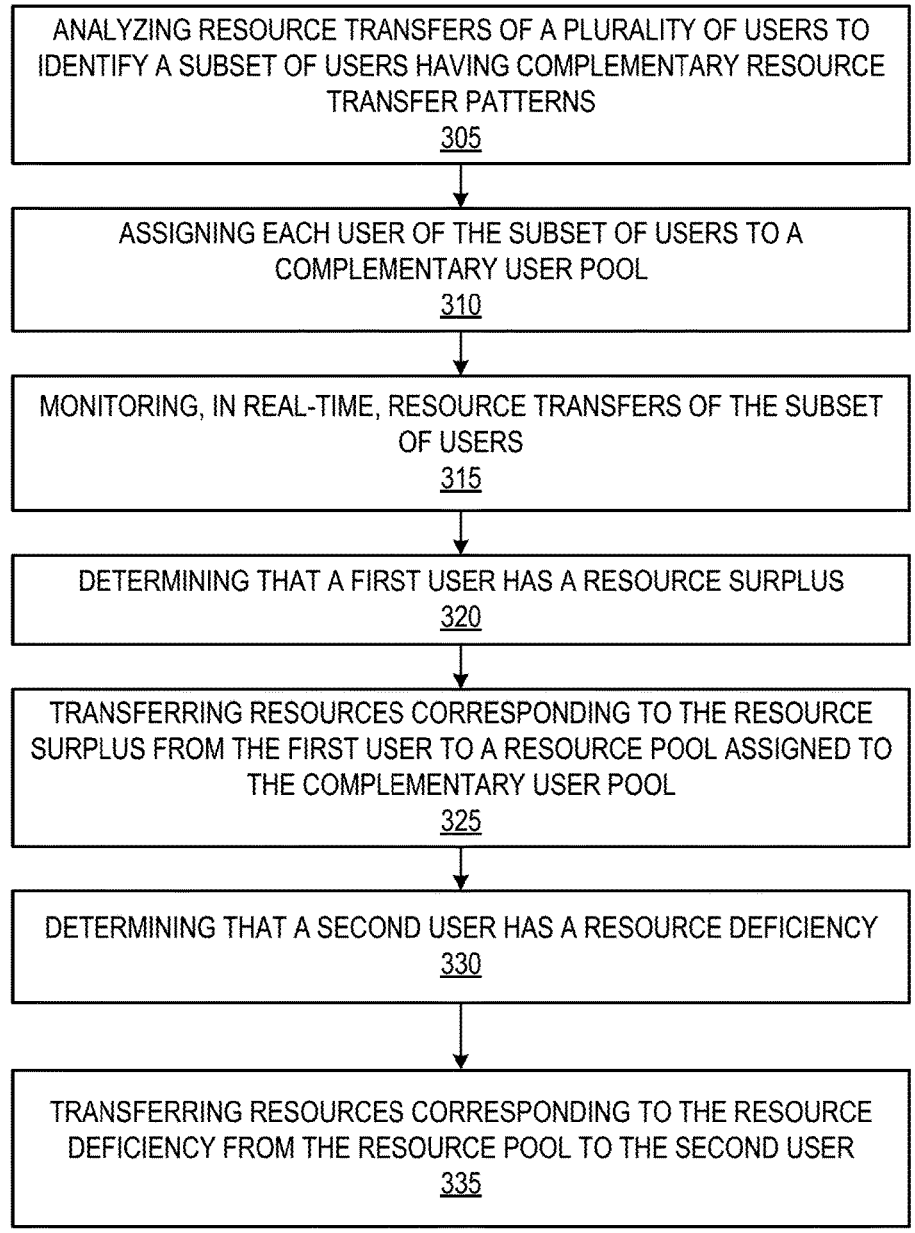

Having thus described embodiments of the invention in general terms, reference will now be made to the accompanying drawings, wherein:

FIG. 1 depicts an operating environment, in accordance with one embodiment of the present invention;

FIG. 2 depicts a schematic of a user device and a resource management server, in accordance with one embodiment of the present invention; and FIG. 3 depicts a method for identifying and redistributing complementary resources, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"User" as used herein may refer to an individual or entity that utilizes a system for identifying, pooling, and managing resources as described herein. In some embodiments, the user may be a representative of a business entity. In other embodiments, the user may be an independent contractor who is looking to offer a resource to other users in the system. For instance, a user may be a participant who wishes to offer services and goods to the other users within the system. To this end, another the user may be a participant who wishes to obtain services or goods from the users within the system. In this way, the system connects users together so that they may efficiently exchanges resources with one another.

"Entity" as used herein may refer to an individual or an organization that owns and/or operates the resource management systems and the associated computing systems. The entity may be a business organization (e.g., a financial institution), a non-profit organization, a government organization, and the like.

"User device" as used herein may refer to a computing device used by the user to access the system through an online portal. The user device may include a processor, a non-transitory storage medium, a communications device, and a display. The system may support user logins and inputs from any combination of disparate devices. Accordingly, the user device may be a portable electronic device such as a smartphone, tablet, or laptop, or the user device may be a stationary unit such as a personal desktop computer or a networked terminal within an entity's premises.

"Resource" as used herein may refer to a property of the user over which the user exercises control, or an asset belonging to the user. For instance, a resource may refer to a particular good or service which the user may wish to provide to or obtain from other users. The resource may further refer to intangible assets, such as a user's credentials.

"Resource data" as used herein may refer to a data structure that is associated with a particular resource. Resource data is identified, manipulated, or classified by the system, and may include various types of information upon which the system performs its various functions. In some embodiments, the information may include an offer to sell goods or services. In other embodiments, the information may include a request for goods or services. The information may further include location data, pricing data, or time data. The information may further include an identity of a user or various characteristics or statistics of the user.

"Classification" as used herein refers to a status attributed to resource data by the system in order to provide for organization or grouping of the resources. In some embodiments, resources may be classified by "likeness," or by certain similar characteristics inherent to the resource. In some embodiments, resources may also be classified according to links established by the system's user base, independently of the "likeness" of the resources within such a classification. In this way, the system may intelligently provide recommendations of resources to the user even if the relevance of such resources to the user is not immediately evident. Classifications for resources may be stored in a classifications database, and may include a unique fixed-length string to identify the classification. The fixed-length string may be a numerical value such as "8251," a cryptographic hash, or a plain-text description of the classification, such as "Linux drivers."

Embodiments of the present invention provide a system for identifying and pooling resources, as well as tools that enable users to manage the pooled resources. In particular, the system may identify resource data provided by an authenticated user and assign a classification to the resource based on the data type. The system may further create logical links between and amongst the resources provided by all authenticated users within the system according to their respective classifications, grouping like resources or related resources together. Resources may be assigned to one or more classifications and may be "tagged" for later identification and retrieval by the system based on the data contained within the resources. For example, the system may classify resources according to various criteria, such as data file types, key words or phrases, upload date, geographic restrictions, and the like. The system may then provide the aggregated data to the user for further processing and input. In some embodiments, the classifications for particular resources and logical links between particular resources may be stored in a classifications database. The system may further provide classifications for users based on the types of resource data they upload or access. For instance, a user may be classified according to certain criteria, such as skillsets, geographic location, areas of expertise/profession, and the like. In this way, the system may build a profile of a user based on the user's numerous classifications, and accordingly recommend certain resources according to the logical links created amongst the user and the resources.

The system may include a data collection module which tracks inputs from users on a real-time basis, where the inputs may be resource data or requests for resources. In some embodiments, the system may further include a data analytics engine that, based on both historical data and data provided by the users in real time, predicts future subsequent actions or inputs by the user based on the resource data provided by the user or actions taken by the user, and provide suggestions of potential resources or portal tools of interest to the user. Such historical data may be stored on a long-term basis in a user input database. By calculating predictions and providing resource or tool suggestions, the system prevents the need for the user to manually seek out resources related to one's interest. For instance, in one embodiment of the invention, a user may upload a file including a sample of source code to the system. The system may detect that the file includes source code, and based on the contents of the source code therein, the system may make a number of recommendations to the user. The system may make this determination, for example, by reading the contents of the source code, such as the types of functions used, the programming language used, and the software libraries incorporated within the code. In response, the system may provide a listing of additional project opportunities that may be suitable to the user. The system may also provide a list of users within the system who could serve as collaborators on a given coding project, which the system identifies by detecting that the users have worked on similar projects in the past. In other embodiments, a user may upload a posting to provide goods or services, where the posting includes data of various file types and may include images, videos, text, and the like. The system may characterize the data within the posting by analyzing it for image or video metadata, or keywords. Based on this analysis, the system may then dynamically provide the user with a number of suggestions for resources that are related to the posting, which may include other users who are potentially interested in the good or service offered, or a suggestion to purchase a material that is necessary to provide the service. In some embodiments, the system may provide rewards to users who exchange resources to other users through the system. In some embodiments, the system may analyze user data (e.g., historic transaction data) to assess the likelihood that a particular user may be unable to or otherwise fail to pay for resources purchased through the system, deliver resources purchased by others through the system, deliver satisfactory resources, and the like. This information may be provided to other users of the system. In addition, the system may guarantee a user payment from another user through the system (e.g., to purchase goods or services from the user) and/or the delivery or quality of a resource purchased through the system. Accordingly, in the event the user does not receive a payment or a resource or the quality of a resource is deficient, the system may compensate the user.

In some embodiments, the system may include an online portal which serves as the interface between the system and the users. The system may run its processes on a server or network of servers which users may access using a computing device. In some embodiments, the system may provide to the user a client application or program which is used to access the server-side application over a network. The online portal may present a graphical interface to the display of the user device, through which the user may select from a number of tools and functions provided by the system. For instance, the system may provide tools to pool resources with or amongst users within the system.

The graphical interface may include a number of panels which may receive inputs or display information to the user. For example, the graphical interface may include a resource input panel, which allows the user to upload resource data into the system. The resource input panel may contain buttons or areas that receive user input related to the resources, such as a text entry box, or a sub-panel through which the user may upload various media files to the system. The graphical interface may further include a resource listing panel, which contains a list of resources sorted by its classification. The resource listing panel may also contain various filters to allow the user to change the number and order of resources listed on the screen at once according to certain criteria, such as upload date, classification, resource contents, popularity, and the like. In this way, the resource listing panel allows the user to effectively browse through the resources uploaded to the system.

The graphical interface may also include a notifications panel, through which the system provides resource recommendations to the user. The resource recommendations displayed in the notifications panel may further contain a selectable link which the user may use to directly access the suggested resource. In some embodiments, the graphical interface may include a resource information panel, which provides a user with statistical data about a selected resource by comparing the user-inputted resource data with like resources data provided by other users within the system. For example, the user may upload a posting to provide a particular good for a particular price. The system may recognize that the posting includes an offer to provide a particular good, identify the classification of the particular good, and retrieve statistical pricing data for the particular good. The system may then provide this data to the user through the resource information panel, and may further provide a pricing suggestion for the good to be provided.

In some embodiments, the system may dynamically track usage data through the resource management application on the user device. In particular, the resource management application may track user inputs, such as mouse cursor positions, touchscreen inputs, key strokes, and the like. The system may establish a secure communication channel with the resource management application or other client application on the user device in order to obtain real-time usage data of the user's actions within the application. Based on these user inputs as well as historical data and the user's attributes/classification(s) (and attributes/classification(s) of resources of the user), the system may predict future actions that the user intends to take (e.g., within a client application) and make recommendations according to the predictions. For instance, the system may track the length of time and level of activity with which the user spends viewing data relating to a particular resource. In such an embodiment, the system may gauge the duration that a user spends viewing a posting for a good or service, and track whether the user has opened any attachments associated with the posting, such as images or videos. In this way, the system may estimate the level of interest in a particular resource by a particular user and assign a "relevance score" to the classification of the particular resource. The system will consider higher relevance scores to represent resources that are more relevant to a user. Subsequently, the system may then provide a list of potentially relevant resources in the notifications panel, which may be populated with references sorted by their relevance score or classification, e.g. users of classification A are typically interested in resources of classifications B, C, and D.

In some embodiments, rather than or in addition to providing suggestions, the data analytics engine may, based on tracking a user's inputs, the user's attributes, resource attributes, historical data, and the like, dynamically predict subsequent actions that the user intends to take within the client application, graphical interface or otherwise when interacting with the resource management system. Thereafter, the system may transmit a command to a client application on the user's device that causes the application to display an interface for performing the predicted future action. For example, the system may have stored historical data which shows that a user requests access to a particular resource when the user logs onto the system in regular time intervals. Upon detecting that the user has logged on, that the calculated time period has passed, and the user has not yet requested the particular resource, the system may automatically prompt the user to access the particular resource. In this way, the system allows the user to bypass the manual extraneous steps to access the particular resource, thereby improving the computing efficiency of the servers on which the system is implemented.

The system may further establish relevance scores or classifications for a resource based on the resource's use by users in the system. For instance, the system may track the number of times one resource is linked to or accessed by another resource. The system may further track the number of times a resource was accessed through the recommendations panel. In this way, the system may intelligently increase the relevant scores for resource combinations/suggestions even if such combinations of classifications were not predefined by the system or its administrators. In other words, the system may dynamically adjust its recommendations system to account for unusual or unexpected resource pairings or changes in trends regarding the resources amongst the system's users.

In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users.

The system addresses a number of computer technology-centric challenges as described above. As noted, the system is typically configured to dynamically predict future actions that a user intends to take (e.g., within a client application on the user's device that interacts with the resource management system) by monitoring a user's inputs, attributes, historical data, and the like. By dynamically predicting future actions, the system is then able to prompt the user to complete the predicted action, while avoiding intermediate interactions that the system would have otherwise had with the user. By avoiding these intermediate interactions, the system is able to reduce demands on computer resources. In addition, by dynamically identifying and pooling like data, the system improves the efficiency of the online system by reducing the incidence of wasted computing resources caused by manual searching of relevant resources by the users. In other words, by automatically providing suggestions for resources based on their identified data classification, the system removes the need for the user to strain the system's servers by manually sifting through irrelevant data. Instead, the system intelligently provides the relevant data to the user before such manual searching takes place, thereby increasing computing efficiency. The types of computing resources saved by the foregoing may include, but are not limited to, processing power, memory space, storage space, cache space, electric power, and networking bandwidth.

FIG. 1 is a block diagram illustrating an operating environment 001, in accordance with one embodiment of the present invention. The operating environment may include a plurality of user devices 100 in operative communication with a resource management server 101 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. The user device may be a mobile device such as a smartphone, tablet, or laptop, a personal computing device such as a desktop computer, smart device, single board computer, or a device owned and operated by an entity, such as a computer system terminal located on the entity's premises. The resource management server 101 is responsible for running the resource management application and running its various processes. It should be understood that the resource management server 101 as depicted herein may be embodied in a single server or multiple servers distributed over varying geographic distances.

Generally, the user devices 100 are used to log onto the resource management server 101 over the network 180 to access the online portal. The resource management server 101 may require that authentication credentials are provided by the user device 100. In some embodiments, the authentication credentials may include a username, password, a biometric identifier, a cryptographic key, a token, and the like. The resource management server 101 may further require that more than one authentication credential is provided as parts of a multi-step authentication process. Once the user has been authenticated, the user may log onto the online portal on the resource management server 101 using the user device 100 to access the resources and resource management tools therein.

In some embodiments, the operating environment may further include a third party server 102 which may be in operative communication with the user device 100, the resource management server 101, or both, over the network 180. The third party server 102 may contain data associated with the user which may be accessed by some of the resource management tools run on the resource management server 101. This configuration allows the resource management server 101 to automatically pull the data associated with the user from the third party server 102 in order to run its various processes. For example, the third party server 102 may contain data relating to the user's financial accounts, and the resource management server 101 may provide tools to manage that data. In such an embodiment, the user may provide a second set of authentication credentials associated with the user's financial account to the third party server 102 directly. Alternatively, the user may store the second set of authentication credentials on the resource management server 101, which may then use said authentication credentials to access the data within the third party server 102.

FIG. 2 is a block diagram illustrating the resource management server 101 and the user device 100 in more detail, in accordance with one embodiment of the present invention. The resource management server 101 typically contains a processor 120 communicably coupled to such devices as a communication interface 110 and a memory 130. The processor 120, and other processors described herein, typically includes circuitry for implementing communication and/or logic functions of the server 101. For example, the processor 120 may include a digital signal processor device, a microprocessor device, and various analog to digital converters, digital to analog converters, and/or other support circuits.

The resource management server may use the communication interface 110 to communicate with other devices over the network 180. The communication interface 110 as used herein may include an Ethernet interface, an antenna coupled to a transceiver configured to operate on a cellular data or WiFi signal, and/or a near field communication ("NFC") interface.

The resource management server may include a memory 130 operatively coupled to the processor 120. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

Typically, a resource management server application 150 is stored within the memory 130 to implement the functions of the online portal through the processor 120 on the resource management server 101. The resource management server application 150 allows a user 170 to connect to the resource management server 101 through a user device 100, in order to access the resource data therein as well as utilize the resource management tools provided through the online portal. The resource management server application 150 includes the logic code portions to determine the appropriate resource recommendations as well as the code portions to collect usage and historical data from the plurality of users 170 within the system.

The memory 130 may further include a database 140 containing data to be processed and/or manipulated by the resource management server application 150. The database 140 may contain usage and historical data provide by the users 170. The database 140 may also contain data on the various classifications to be used to categorize the resources and the users, on what classifications correspond to which resources, as well as logical links between and amongst the various resources and the users. It should be understood that while the database 140 is depicted as a single unit within a single resource management server in FIG. 3, the database 140 may represent multiple databases implemented across multiple resource management servers 101. It should also be understood that the resource management server application 150 may implemented in a distributed manner amongst a plurality resource management servers 101. The database 140 may also be stored on a separate, distinct memory 130 from the resource management server application 150.

The user device 100 typically also includes a processor 121 operatively coupled to a communication interface 111 and a memory 131. The memory 131 typically stores a resource management client application 151, which causes the processor 121 to display a user interface 160 to the user 170. It should be understood that the display on which the user interface 160 is presented may include an integrated display (e.g. a tablet or smartphone screen) within the user device 100, or an external display device (e.g. a computer monitor or television). The resource management client application 151 establishes a connection with the resource management server application 150 over the network 180 to allow the user 170 to access the various functions of the system. In particular, the resource management client application 151 receives inputs from the user interface 160, which may include such inputs as user authentication credentials, requests to upload resource data, which may include various types of data such as activity data, to the resource management server 101, requests to utilize the resource management tools of the resource management server application 150, and the like.

In a typical embodiment of the invention, the user 170 accesses the resource management client application 151 through the user interface 160. The resource management client application 151 sends a request over the network 180 to establish a communication link with the resource management server 101 through the resource management server application 150. Upon receiving the request, the resource management server application 150 causes the resource management server 101 to send a command to the user device 100 to prompt the user 170 for authentication credentials through the user interface 160. Upon receiving authentication credentials from the user 170, the resource management client application 151 sends the authentication credentials to the resource management server application 150. Upon successful authentication, a communication link between the resource management client application 151 and the resource management server application 150 is established. The user 170 then provides a request to upload resource data to the resource management client application 151, which then sends the resource data to the resource management server application 150. The resource management server application 150 then processes the contents of the resource data, and based on a combination of user inputs, historical data within the database 140, and various types of data found within the resource data, adds classifications or tags to the user 170 and/or the resource data provided by the user. The resource management server application 150 then predicts future actions that the user 170 intends to take within the user interface 160, and prompts the user through a notification to take the intended future action.

The system may store user activity data within the online portal within the database 140. In some embodiments, the resource management server application 150 may cause the processor 120 to periodically query the user device 100 to obtain snapshots of the state of the resource management client application 151. Upon receiving the query, the resource management client application 151 immediately obtain a snapshot of user actions taken within the graphical interface, then send the snapshot to the resource management server 101. In other embodiments, the resource management client application 151 may continuously track user inputs and temporarily store them in the memory 131, then send the history of user inputs to the resource management server 101 upon receiving the query. In other embodiments, the resource management client application 151 may periodically track the user's inputs and push the input data to the resource management server 101 without waiting to receive a query.

Referring now to FIG. 3, a method 003 is provided for identifying and redistributing complementary resources. This method 003 may be performed by the system described herein (e.g., by the resource management server 101).

Initially, at block 305, the systems may analyze resources transfers of a plurality of users (e.g., users of the system) to identify a subset of users having complementary resource transfer patterns. As used herein, a "resource transfer" or "transaction", may refer to any activities or communication between a user and the entity, activities or communication between multiple entities/users, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a user and a resource entity such as a merchant, between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

A group (e.g., subset) of users typically have complementary resource transfer patterns (e.g., income patterns, patterns of obtaining/selling goods or services, inventory patterns, and the like) if the users individually have varying resource transfer patterns, but the users, when aggregated, have a fairly stable/constant resource transfer patterns with respect to particular/similar type of resource. For example, two users may have a history of annually consuming similar amounts of a certain good for their respective businesses; however, a first user may generally consumes a high amount of the good during the first two quarters of the year, and a second user may generally consumes a high amount of the good during the third and fourth quarters of the year. Thus, their consumption of the good would be complementary, because although their consumption varies individually, the aggregate/average consumption of the good by the two users may be relatively constant. By way of further example, several users may have similar annual incomes, but different time periods in which their incomes are relatively high or low compared to other time periods. Although these users' incomes may vary individually (e.g., on a monthly basis), their incomes may be complementary such that the aggregate income of the users may be fairly stable (e.g., on a monthly basis).

In order to identify users typically have complementary resource transfer patterns, the system may analyze various types of data related to the users. For example, the system may analyze the users' transaction history, usage of the system (e.g., exchanging resources through the system), business data, user classifications, resource classifications, and the like. This information may be obtained from the user (e.g., from a user device), previously stored on the resource management server 101, obtained from another entity system, and/or obtained from a third party.

Once a subset of users having complementary resource patterns has been identified, at block 310, each user of the subset of users is typically assigned of a complementary user pool (e.g., to a defined group of users determining to have complementary resource patterns).

At block 315, resources transfers (e.g., transactions) of the subset of users (i.e., of the users assigned to the complementary user pool) are monitored (e.g., in real time or near real time). Information regarding the resource transfers of the subset of users may be obtained from the users (e.g., from a client application operating on a user device of a user), from another entity system (e.g., an entity transaction server), or from a third party system. The resource management server 101 may establish a secure communication channel with these other systems in order to obtain real-time resource transfer information.

Based on this monitoring, at block 320, it is determined that a first user of the subset of users has a resource surplus. For example, the first user may have a higher than average amount of funds in an account of the first user due a period of higher than average income. By way of further example, the first user may have a higher than average inventory of a particular good that the first user regularly buys or sells. Typically, the resource surplus relates to the complementary resource pattern of the subset of users. For example, if the subset of users were grouped together because they have complementary income patterns, then the resource surplus may reflect that the first user has had a period of high income. The amount of the surplus is typically the amount of the particular resource of the resource surplus exceeds the first user's average amount of such resource.

Next, at block 325, resources corresponding to the resource surplus are typically transferred from the first user to a resource pool assigned to the complementary user pool. For example, if the first user has a surplus of X dollars in an account of the first user (e.g., due to a period of higher than usual income), the resource management server 101 may transfer the surplus of X dollars from the account of the first user to the resource pool (e.g., to a common account assigned to the complementary user pool).

Based on monitoring the resources transfers of the subset of users, at block 330, it is determined that a second user of the subset of users has a resource deficiency. For example, the second user may have a lower than average amount of funds in an account of the second user due a period of lower than average income. By way of further example, the second user may have a lower than average inventory of a particular good that the second user regularly buys, sells, or uses. The amount of the deficiency is typically the amount of the particular resource of the resource deficiency exceeds the second user's average amount of such resource.

Next, at block 335, resources corresponding to the resource deficiency are typically transferred from the resource pool assigned to the complementary user pool to the second user. For example, if the second user has a deficiency of Y dollars in account of the second user (e.g., due to a period of lower than usual income), the resource management server 101 may transfer Y dollars from the resource pool to an account of the second user.

By transferring resource to the resource pool from users having resource surpluses and from the resource pool to users have resource deficiencies, the system is able to even out the resources and resource flows of the users in a complementary user pool. In this regard, a particular user transfers surpluses to the resource pool, but it then able to obtain resources corresponding to any resource deficiency experienced by the user.

In one alternative embodiment, instead of transferring resources to and from a common resource pool, users in a complementary user pool may directly transfer (e.g., allow another user to borrow) resources from one user to another based on which users in the pool have a resource surplus or deficiency.

In another alternative embodiment, the system may track when a particular user typically has a resource surplus, deficiency and/or need. When the system determines that the user has a present surplus, the system may transfer resources to resource pool (e.g., account) to be used when the user has a deficiency or may recommend that the user transfer resources corresponding to future resource needs (e.g., by paying future bills ahead of time).

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/433,804 (now published as U.S. Patent App. Pub. No. 2018/0234353) | COMPUTING SYSTEM FOR IDENTIFYING, POOLING, AND MANAGING RESOURCES | Concurrently herewith |
| 15/433,813 (now published as U.S. Patent App. Pub. No. 2018/0232682) | SYSTEM FOR IDENTIFICATION AND INTEGRATION OF LIKE RESOURCES AND CONFIGURING RESOURCES FOR COMMON USE | Concurrently herewith |
| 15/433,818 (now U.S. Patent No. 10,164,855) | SYSTEM FOR DYNAMICALLY MANAGING RESOURCE CONNECTIVITY | Concurrently herewith |

The invention claimed is:

1. A computerized system for identifying and redistributing complementary resources, comprising:
a communication device in communication with a plurality of user devices of a plurality of users over a network, the plurality of user devices comprising a first user device of a first user and a second user device of a second user;
a processor;
a memory; and
a resource management module stored in the memory, executable by the processor and configured for:
analyzing resource transfers of the plurality of users to identify a subset of users having complementary resource transfer patterns;
assigning each user of the subset of users to a complementary user pool;
monitoring, in real-time, resource transfers of the subset of users assigned to the complementary user pool, the subset of users comprising the first user and the second user, wherein monitoring the actions of the first user within the client application comprises tracking the first user's mouse cursor position, touchscreen inputs, key strokes, and time accessing a particular feature of the client application;
determining that the first user has a resource surplus;
in response to determining that the first user has the resource surplus, transferring resources corresponding to the resource surplus from the first user to a resource pool assigned to the complementary user pool;
determining that the second user has a resource deficiency;
in response to determining that the second user has the resource deficiency, transferring resources corresponding to the resource deficiency from the resource pool assigned to the complementary user pool to the second user;
establishing a secure communication channel with a client application stored on the first user device of the first user;
collecting, over the secure communication channel, resource data associated with the first user from the client application;
based on collecting the resource data associated with the first user, identifying a plurality of resources of the first user;
classifying each resource of the plurality of resources; and
based on classifying each resource of the plurality of resources, predicting a future user action of the first user within the client application.

2. The computerized system according to claim 1, wherein the resource management module is configured for:
monitoring, in real-time, over the secure communication channel, actions of the first user within the client application, wherein, predicting a future user action of the first user within the client application is further based on monitoring the actions of the first user within the client application;
in response to predicting the future user action, transmitting, over the secure communication channel, a command to the client application, wherein the command is configured to cause the client application to display an interface for performing the future user action.

3. The computerized system according to claim 2, wherein the resource management module is configured for:
collecting, over the secure communication channel, user data associated with the first user from the client application; and
based on collecting the user data associated with the first user, determining at least one user attribute.

4. The computerized system according to claim 3, wherein:
determining the at least one user attribute is based on classifying each resource of the plurality of resources.

5. The computerized system according to claim 3, wherein predicting the future user action is further based on the at least one user attribute.

6. A computer program product for identifying and redistributing complementary resources, comprising a non-transitory computer-readable storage medium having computer-executable instructions for:
analyzing resource transfers of a plurality of users to identify a subset of users having complementary resource transfer patterns;
assigning each user of the subset of users to a complementary user pool;
monitoring, in real-time, resource transfers of the subset of users assigned to the complementary user pool, the subset of users comprising a first user and a second user, wherein monitoring the actions of the first user within the client application comprises tracking the first user's mouse cursor position, touchscreen inputs, key strokes, and time accessing a particular feature of the client application;
determining that the first user has a resource surplus;
in response to determining that the first user has the resource surplus, transferring resources corresponding to the resource surplus from the first user to a resource pool assigned to the complementary user pool;
determining that the second user has a resource deficiency;
in response to determining that the second user has the resource deficiency, transferring resources corresponding to the resource deficiency from the resource pool assigned to the complementary user pool to the second user;
establishing a secure communication channel with a client application stored on the first user device of the first user;

collecting, over the secure communication channel, resource data associated with the first user from the client application;

based on collecting the resource data associated with the first user, identifying a plurality of resources of the first user;

classifying each resource of the plurality of resources; and based on classifying each resource of the plurality of resources, predicting a future user action of the first user within the client application.

7. The computer program product according to claim 6, wherein the non-transitory computer-readable storage medium has computer-executable instructions for:

monitoring, in real-time, over the secure communication channel, actions of the first user within the client application, wherein, predicting a future user action of the first user within the client application is further based on monitoring the actions of the first user within the client application;

in response to predicting the future user action, transmitting, over the secure communication channel, a command to the client application, wherein the command is configured to cause the client application to display an interface for performing the future user action.

8. The computer program product according to claim 7, wherein the non-transitory computer-readable storage medium has computer-executable instructions for:

collecting, over the secure communication channel, user data associated with the first user from the client application; and based on collecting the user data associated with the first user, determining at least one user attribute.

9. The computer program product according to claim 8, wherein:

determining the at least one user attribute is based on classifying each resource of the plurality of resources.

10. The computer program product according to claim 8, wherein predicting the future user action is further based on the at least one user attribute.

11. A computerized method of identifying and redistributing complementary resources, comprising:

analyzing, via a computer processor, resource transfers of a plurality of users to identify a subset of users having complementary resource transfer patterns;

assigning, via a computer processor, each user of the subset of users to a complementary user pool;

monitoring, in real-time, via a computer processor, resource transfers of the subset of users assigned to the complementary user pool, the subset of users comprising a first user and a second user, wherein monitoring the actions of the first user within the client application comprises tracking the first user's mouse cursor position, touchscreen inputs, key strokes, and time accessing a particular feature of the client application;

determining, via a computer processor, that the first user has a resource surplus;

in response to determining that the first user has the resource surplus, transferring, via a computer processor, resources corresponding to the resource surplus from the first user to a resource pool assigned to the complementary user pool;

determining, via a computer processor, that the second user has a resource deficiency;

in response to determining that the second user has the resource deficiency, transferring, via a computer processor, resources corresponding to the resource deficiency from the resource pool assigned to the complementary user pool to the second user establishing, via a computer processor, a secure communication channel with a client application stored on the first user device of the first user;

collecting, via a computer processor over the secure communication channel, resource data associated with the first user from the client application;

based on collecting the resource data associated with the first user, identifying, via a computer processor, a plurality of resources of the first user;

classifying, via a computer processor, each resource of the plurality of resources; and based on classifying each resource of the plurality of resources, predicting, via a computer processor, a future user action of the first user within the client application.

12. The method according to claim 11, comprising:

monitoring, in real-time, over the secure communication channel, actions of the first user within the client application, wherein, predicting a future user action of the first user within the client application is further based on monitoring the actions of the first user within the client application;

in response to predicting the future user action, transmitting, over the secure communication channel, a command to the client application, wherein the command is configured to cause the client application to display an interface for performing the future user action.

13. The method according to claim 12, comprising:

collecting, over the secure communication channel, user data associated with the first user from the client application; and based on collecting the user data associated with the first user, determining at least one user attribute.

14. The method according to claim 13, wherein:

determining the at least one user attribute is based on classifying each resource of the plurality of resources.

15. The method according to claim 13, wherein predicting the future user action is further based on the at least one user attribute.

16. The method according to claim 12, wherein the command is configured to cause the client application to display in response to the first user logging on the client application.

17. The computerized system according to claim 2, wherein the command is configured to cause the client application to display in response to the first user logging on the client application.

18. The computer program product according to claim 7, wherein the command is configured to cause the client application to the first user logging on the client application.

* * * * *